United States Patent Office 3,377,791
Patented Apr. 16, 1968

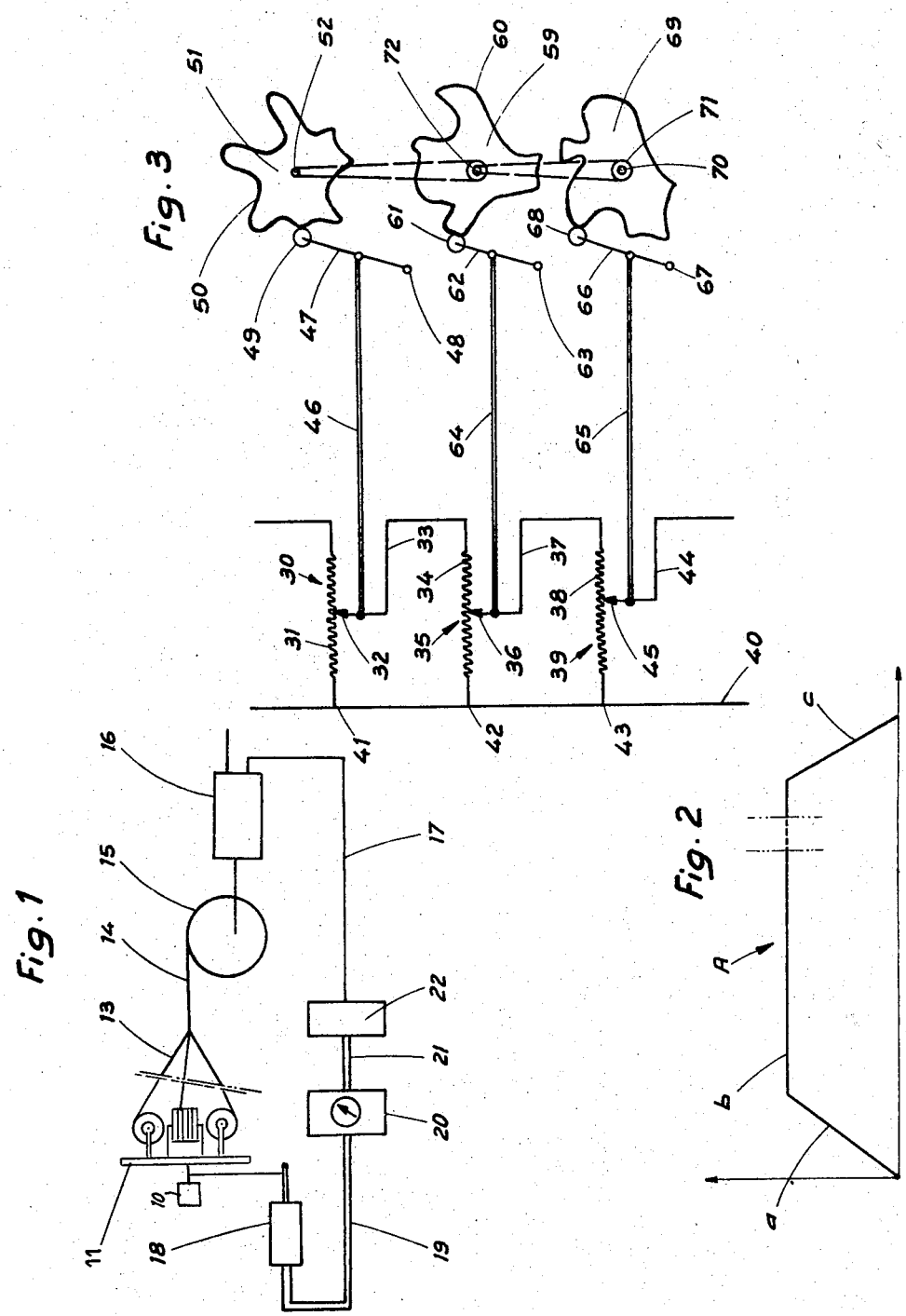

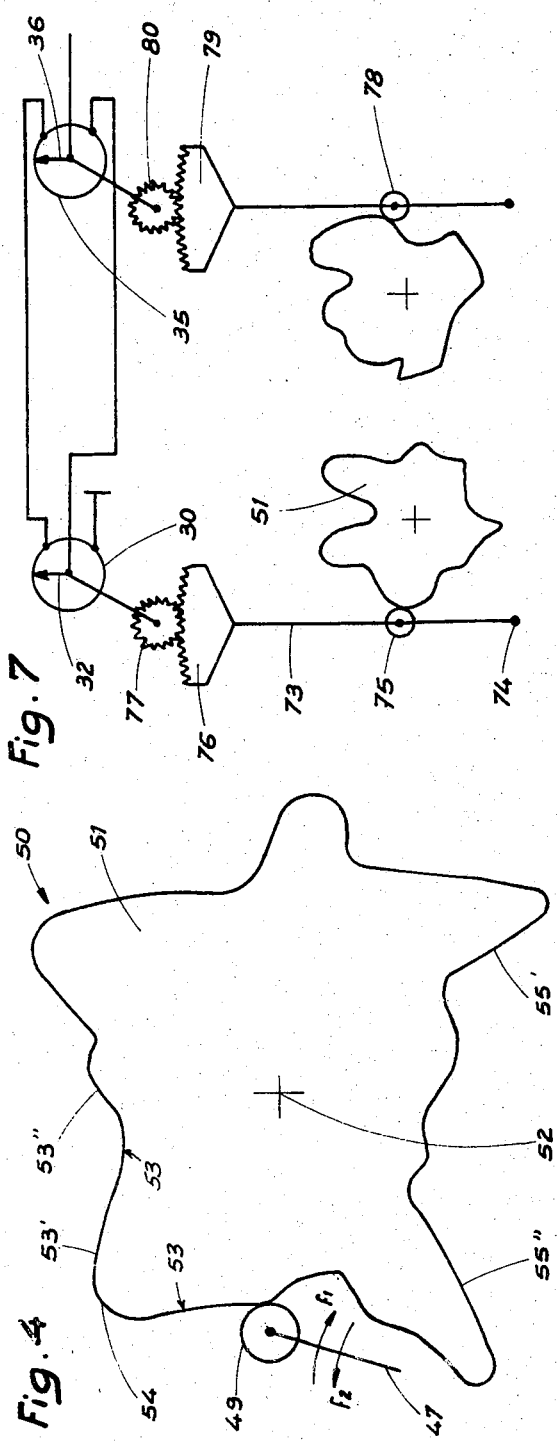

3,377,791
MANUFACTURE OF TELEPHONE CABLES
Roland Lemaire, Fere-en Tardenois, France, assignor to Societe Etudes et Fabrications, Paris, France
Filed May 3, 1965, Ser. No. 452,815
Claims priority, application France, May 4, 1964, 973,266
3 Claims. (Cl. 57—62)

ABSTRACT OF THE DISCLOSURE

Apparatus for producing an assembled bundle of twisted wires in which the wires are drawn from a rotary support by a capstan driven by an electric motor at variable speed in accordance with the random variation of its electrical control current supplied by a tachometer generator driven by the rotary support. The variation of the control current is obtained by a pluality of potentiometers connected between the tachometer generator and the motor, and wherein the movable contact members of the potentiometers are driven by respective cams in turn driven via meshing gears having different prime numbers of teeth so that the ratio of the speed of the motor to the speed of the rotary support is never duplicated.

---

The present invention generally relates to apparatus for producing telephone cables, more particularly of the kind comprising quad or spiral-four structures, i.e. assemblies of four separately insulated conductors spirally wound.

In such telephone cables, the aggregate of such individually insulated, spirally wound conductors is assembled together—in the case of quads—in so-called quadding or twisting machines. Several such four-wire or quad structures thus obtained, may again be assembled together by spiral winding to form a cable, or alternatively, the assembled quads constitute a cable element and several such cable elements are assembled together by spiral winding to provide a cable.

If no precautionary measures are adopted, the closeness of the telephone conductors within the same cable will give rise to disturbances in the telephone connections, due to induction phenomena between two conductors, such disturbances being the more significant as the conductors are nearer one another and as the approaching points are more numerous.

It has already proposed, for eliminating such a drawback, to use a different pitch for each contacting quad, but up to the present it was not possible to build a machine adapted to produce quads with different pitches in order to satisfy the required conditions.

It is therefore an object of the invention to provide such an improved machine for producing quads which may be used in the manufacture of cables without taking special precautionary measures to ensure undisturbed telephone transmissions.

It is a further object of the invention to provide quad structures such that any one quad may be assembled with any other quad, without giving rise to disturbances.

According to the invention, the quads produced by the machine have a helical pitch varying continuously according to a function such that no reproduction is possible between two quad portions, whatever the portions considered.

The invention, as applied to machines wherein the helical pitch is determined by the control of the speed of the electric pulling motor relative to the rotation speed of the conductor drum support, provides, for determining the control voltage of the speed of the electric pulling motor, at least two cascade-connected potentiometer devices, both of which vary periodically, the drive of one of the potentiometer devices deriving from the other potentiometer device via a pair of gears having a number of teeth the ratios of which are given by prime numbers between them.

The invention will be best understood from the following description and appended drawings, wherein:

FIGURE 1 is a diagrammatic view of part of an improved quadding machine in accordance with the invention.

FIGURE 2 is an explanatory graph.

FIGURE 3 is a diagrammatic view of a potentiometric device according to the invention.

FIGURE 4 is a diagrammatic view of a cam member included in said device.

FIGURE 5 is an explanatory graph.

FIGURE 6 is a diagrammatic view illustrating an embodiment of a coupling system of two cam members.

FIGURE 7 is a diagrammatic view of the means for driving the potentiometers from the cam members.

The four reels for supplying the conductors adapted to form a quad structure are connected to a reeling assembly 11 driven in rotation by motor 10. Except for the starting and stopping periods, a bundle of wires issued from the reels will rotate at a constant angular speed. In FIGURE 2, a graph of these angular speeds is illustrated by the straight line A, which has a straight rectilinear ascending portion $a$ corresponding to the starting, a horizontal portion $b$ and a descending portion $c$ corresponding to the stopping period, after the reels have been emptied, the quad obtained having generally a length of several hundred meters. The conductors 13 issued from the reels are assembled into a quad 14 which passes over a drum or capstan 15 driven by an electric motor 16 (FIGURE 1). Advantageously, this motor is of the type the speed of which is proportional to a control current applied thereto by a circuit 17, the voltage applied by said circuit being related, according to the invention, to the angular speed of the reel assembly 11 in such a manner that the ratio of said values is never duplicated during the period of operation.

To this end, a tachometer generator 18 is driven at the speed of reel assembly 11, to supply at its output 19 a voltage proportional to said speed. The voltage derived is applied to the circuit 17 via a potentiometer unit 20, which may be manually controlled, followed by and connected to a potentiometric device 22 which is an important part of the invention and which will be described in more detail with reference to FIGURE 3.

FIGURE 3 shows diagrammatically, by way of example, one embodiment of the potentiometer device 22. The device comprises a first potentiometer 30 including a resistor 31 and a cursor or sliding contact 32 connecting via a conductor 33 a resistor 34 of a second potentiometer 35, the sliding contact 36 of which connects, via a conductor 37, a resistor 38 of a third potentiometer 39, the control voltage being collected between conductor 40 connected to the end portions 41, 42 and 43 of the resistors, respectively, and the conductor 44 connected to sliding contact 45 of the latter potentiometer.

Alternatively, the invention provides a potentiometric device comprising only two potentiometer units, the control voltage of the motor being, under these conditions, collected between the conductor 40 and the conductor 37.

The travel of the sliding contact such as 32 of a potentiometer is obtained by attaching the contact through a linkage 46 to a lever 47 mounted for rotation about an axle 48 and ending with a roller 49 bearing against the face or outline 50 of a cam 51 driven in counterclockwise rotation with axle 52. Advantageously, face 50 (FIGURE 4) is formed with a succession of portions such as 53 interconnected by means of portions 54; while portions 53 are substantially rectilinearily shaped, two adjacent portions such as 53' and 53" form therebetween a comparatively wide angle.

It is also noted in FIGURE 4 that the angular position of lever 47, when roller 49 drivingly cooperates with portion 53', varies according to a predetermined function, and that, when roller 49 engages portion 53", the angular position will vary according to another given function. During the engagement of roller 49 with portion 53', lever 47 will move along the direction indicated by arrow $f_1$, at a comparatively low speed, and when roller 49 engages portion 53", lever 47 will move in the direction of arrow $f_2$, at a comparatively low speed.

When roller 49 engages a portion 55' the profile of which is more radial than portions 53' and 53" relative to axis 52, the variation of the angular position is more rapid, which is also the case when roller 49 engages portion 55", the direction of the variation for this latter portion also being different from that due to the engagement thereof with portion 55'.

FIGURE 5 is a graph illustrating, by way of example, in its upper portion, the variation of the voltage tapped intermediate the conductor 33 and the conductor 40, the highest maximum value $u_1$ corresponding, for instance, to the point of the profile 50 of the cam which is farthest from axle 52, and the lowest minimum value $u'_1$ corresponding to the point of profile 50 of cam 51 which is the least distant from axle 2. The mean voltage value, shown diagrammatically by broken line $u_0$, which is substantially horizontal, may be controlled by means of potentiometer 20 or main potentiometer.

On axle 52 of cam member 51 there is secured a pinion 56 with a number of teeth equal to, say, $n$, engaged with a pinion 57 having a number of teeth equal to N, $n$ and N being selected so as not to be divisible one by the other. On axis 58 of pinion 57 is secured a second cam 59, the profile of which is similar to that of cam member 51, or identical therewith if desired, and cooperating with profile 60 of said cam 59 is a roller 61 forming the end portion of a lever 62 mounted for rotation about an axle 63; onto lever 62 is pivotally mounted a link or rod member 64 and pivotally mounted, at its other end, on sliding contact 36. The variation of the voltage introduced by potentiometer 35 is controlled by the rotation of cam 59 and cam 51, said two cams being unable to assume twice the same relative angular position. With a pinion 57 having a larger diameter than that of pinion 56, as illustrated, and a number of teeth which are, for instance, in the ratio of "97" to "13," the graph of the variation of the voltage introduced by sliding contact 36 shows, as illustrated at $u_2$ (FIGURE 5), a much slower variation for comparable slopes of the constitutive parts of the cam members.

In the embodiment illustrated in FIGURE 3, the sliding contact 45 is mounted at the end of a third link or rod 65 the other end of which is pivotally mounted about a third lever 66 mounted for rotation about an axle 67 and carrying on its end portion a roller 68 cooperating with cam 69 on the axle 70 of which is secured a pinion 71 driven from a pinion 72 secured on axle 58, the number of the teeth of pinions 71 and 72 not being divisible one by the other, i.e., they cannot be represented by a rational number. The variation of the voltage introduced by potentiometer 39 is shown graphically by line $u_3$ in FIGURE 5, this variation being still slower than that introduced by potentiometer 35. The final voltage collected at the output of the potentiometric device 22 is derived from the sum of the voltages occurring at the outputs of potentiometers 30, 35 and 39; it varies at each instant as a function of time and it never assumes twice the same value, whatever the length of time during which the device is operating.

The lobes and troughs of a cam, their number and the various slopes connecting these troughs and lobes, are arranged in such a manner that the variation provided by the cam is a maximum safety precautioin against the non reproduction of the successive values of an electric magnitude controlled from said cam.

FIGURE 7 shows, by way of example, a lever 73 mounted for rotation about an axle 74 and carrying a roller 75 at a point intermediate in its length, cooperating with a first cam 51. Said lever terminates in a toothed segment 76 forming the driving assembly of the sliding contact through a small pinion 77. Similar kinematic means are provided for driving the sliding contact 36 of the second potentiometer 35 with a roller 78, a toothed segment 79 and a small pinion 80.

A machine equipped according to the invention is also adapted to produce constant pitch quad structures: a simple switch unit enables the switching on and off the potentiometric device provided with the cams, as described.

The pitch is moreover continuously adjustable by controlling the main potentiometer. Such a control may be desirable, whether the cammed potentiometer device is switched on or off.

The direction of quadding,—to the left or to the right —may be controlled simply by manipulating a throwover switch contact, without its being necessary to move a member such as a speed-gear lever or reverse or pinion levers, etc.

What is claimed is:

1. In an installation for producing a bundle of conductor wires with an insulating coating and assembled by twisting as the wires are supplied from reels mounted on a rotary support and drawn therefrom by a capstan driven by an electric motor at variable speed varying in accordance with the random variatioin of its electric control current supplied by a tachometer generator driven by the rotary support, an improvement comprising a potentiometric device interposed between the tachometric generator and the drive motor for the capstan comprising: a rotary disk having a peripheral cam surface whose distance varies from the center of rotation of the disk, a roller in contact with the cam surface to follow the same, lever means supporting the roller, and a potentiometer including a movable member supported by the lever means and movable therewith, a second disk mounted for rotation and having a peripheral cam surface whose distance varies from the center of rotation of the second disk, a pair of meshing gears for driving the second disk from the first disk, said gears having respective numbers of teeth the ratio of which is not an integer, a second roller in contact with the cam surface of the second disk to follow the same, lever means supporting the second roller, and a second potentiometer including a respective movable member supported by the second lever means, the second potentiometer being connected with the first potentiometer between the tachometric generator and the capstan drive motor to vary the voltage delivered by the generator to the motor so that the ratio of the speed of the motor to the speed of the rotary support is never duplicated.

2. An installation according to claim 1, comprising manually controlled potentiometric means interposed between the tachometric generator and the potentiometric device.

3. An installation as claimed in claim 1, wherein said gears have respective numbers of teeth which are prime numbers.

References Cited

UNITED STATES PATENTS 2,869,316   1/1959   Lilly _____ 57—93
3,140,577   7/1964   Ash _____ 57—59

FOREIGN PATENTS 591,294   4/1959   Italy.

OTHER REFERENCES

German printed application, 1,053,053; Schmitler; March, 1959 57–63.

WILLIAM S. BURDEN, *Primary Examiner.*